United States Patent [19]

Penn et al.

[11] Patent Number: 5,117,400
[45] Date of Patent: May 26, 1992

[54] OPTICAL CALIBRATION OF TOWED SENSOR ARRAY

[75] Inventors: William A. Penn, Baldwinsville; Donald W. Winfield, Camillus, both of N.Y.

[73] Assignee: General Electric Company, Syracuse, N.Y.

[21] Appl. No.: 632,528

[22] Filed: Dec. 24, 1990

[51] Int. Cl.$^5$ .............................................. G01S 15/00
[52] U.S. Cl. ........................................ 367/128; 367/13
[58] Field of Search ................... 367/128, 12, 13, 106, 367/130, 19; 356/1-4; 342/53, 54

[56] References Cited

U.S. PATENT DOCUMENTS 3,713,082 1/1973 Menoche ............................ 367/128

*Primary Examiner*—Daniel T. Pihulic
*Attorney, Agent, or Firm*—Paul Checkovich; Geoffrey H. Krauss

[57] ABSTRACT

An energy beam-forming array of N+2 stations which utilizes a companion network of N optical sensors which mutually image each other to determine deviations of the optical sensors, and therefore the energy-receptive sensors, from a common linear axis. Each optical sensor measures the equivalent of a second-difference, which are then combined to reconstruct the actual array deviations. Each optical sensor is equipped with at least one pinpoint light source, to provide a light beam to an imaging subsystem provided at the next sensor station. The imaging subsystem includes a lens, either simple or compound, coupled to a retinal sensor array. The location of the light source image at the retinal array provides all of the necessary information for reconstruction of the array sensor location.

20 Claims, 4 Drawing Sheets

OPTICAL CALIBRATION OF TOWED SENSOR ARRAY

FIELD OF THE INVENTION

The present invention relates to sensor arrays and, more particularly, to a novel method of, and apparatus for, determining the amount of (acoustic) phase correction for each of a plurality N of sensor elements of an energy-receiving array, to restore the array to diffraction-limited operation if at least one of the array elements is moved from a predetermined (typically straight) line.

BACKGROUND OF THE INVENTION

It is now well known to utilize a linearly-extended array of a plurality N of sensors to form a reception energy beam which can provide information as to the range and direction to an external source of the energy received by the array. Such arrays can be utilized with sound energy, particularly where the propagation medium is a liquid; in such sound-acquisition-and-ranging (sonar) arrays, typical acoustic frequencies in the 10-1000 Hz. range are used. The (sonar) array may be a linearly-extended array, extended along a straight line curve, which array is towed through the water by a ship. It is well known that, in order to achieve diffraction-limited or near-diffraction-limited beam-forming capability in towed linear sonar arrays, it is essential that any deviation from a linear common axis be known and that phase correction be made for each sensor element, by an amount which will vary accordingly to the deviation of that particular sensor from the common axis line. A monotonically-curved array will suffer a defocusing effect without such correction; an array undergoing a more complex form of curvature will also suffer from higher order aberrations.

Many approaches have been suggested for determining the shape of such an elongated array. In one example, magnetic heading sensors, based on compass action, have been suggested to provide information as to the angular orientation of each sensor element in the array; an assumed analytic curve can be fitted to match the angular heading data of each array sensor, if known. Another suggested approach is measurement of the translational velocity of each array element, with respect to the medium (water) through which the array is travelling, and the integration of this translational velocity data to provide element displacement; this method is based upon an assumption that displacements average out to zero and must provide a uniform starting constant for an integration process. Thus, some assumption is required in all of the hitherto-suggested approaches, e.g. an assumed curve description, use of a zero mean value, and the like. The resulting displacements are thus theoretically only approximations. It is highly desirable to provide apparatus for measuring actual displacements, with which data a method for correcting the phase of the signal from each of a plurality of array sensor elements can be provided to restore the array to diffraction-limited operation.

BRIEF SUMMARY OF THE INVENTION

In accordance with the invention, an energy beam-forming array of a plurality N+2 of stations utilizes a companion network of N optical sensor pairs which mutually image each other to determine deviations of the optical sensors, and therefore the energy-receptive sensors, from a common linear axis. Each optical sensor pair measures the equivalent of a second-difference, which second differences are then properly combined, by addition and subtraction, to reconstruct the actual array deviations. Each optical sensor or pair is equipped with at least one pinpoint light source, such a LED, to provide a light beam to a neighboring imaging subsystem. The imaging subsystem includes lens means, which may be simple or compound, coupled to a retinal sensor, such as a CCD solid-state detector array. The locations of the light source images at all the retinal arrays provide all of the necessary information for reconstruction of the array sensor locations. A relatively low data-rate readout of this information from each optical sensor of the array provides for a closed and accurate reconstruction of the array shape, from which information proper acoustic phase corrections can be made to obtain diffraction-limited operation. The forward-looking and backward-looking beams from each of the N intermediate sensors give data which can be array processed to yield a matrix of offset errors.

In one presently preferred embodiment, additional light sources are used to provide information as to array twist. Each module contains a pair of back-to-back sensing stations, each substantially a mirror image of the other, to allow one forward and one backward vector to be obtained per module. Local CCD retinal array electronics and preliminary data processing means can be placed in each module.

Accordingly, it is an object of the present invention to provide a novel method of, and apparatus for, determining the amount of phase correction to be made to each of a plurality of sensor elements of an energy-receiving array, to restore that array to diffraction-limited operation if at least one of the sensor elements is moved from a common line of the array.

This and other objects of the present invention will become apparent to those skilled in the art upon consideration of the following detailed description, when read in conjunction with the drawings.

DETAILED DESCRIPTION OF A PRESENTLY PREFERRED EMBODIMENT

Figure 1A:
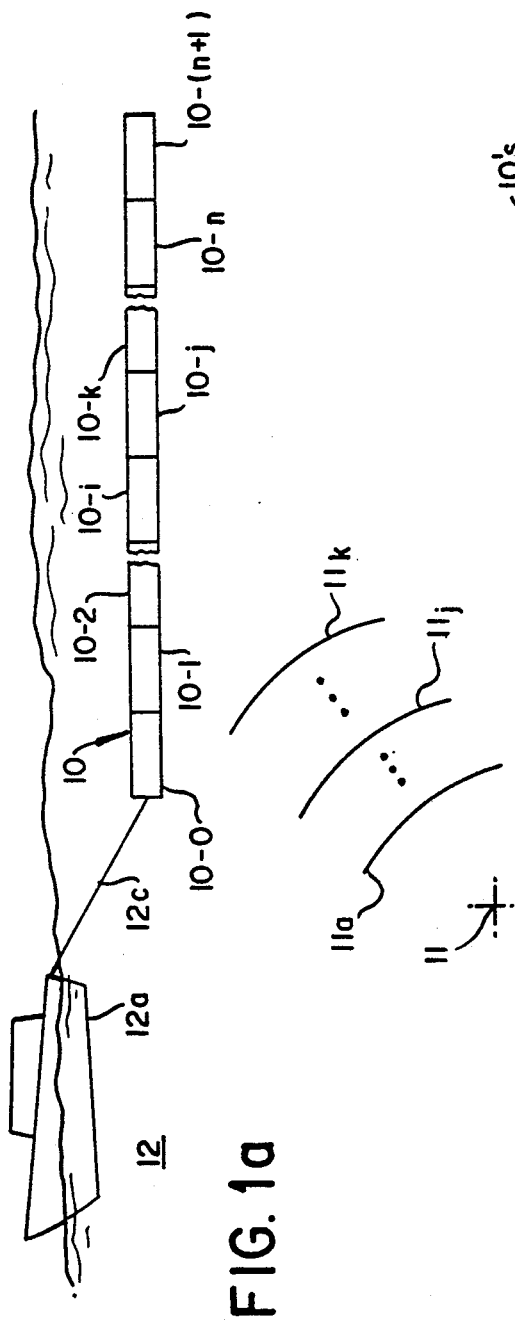
FIG. 1a is a somewhat schematic representation of a towed acoustic array, of the environment in which it is used.
Figure 2:
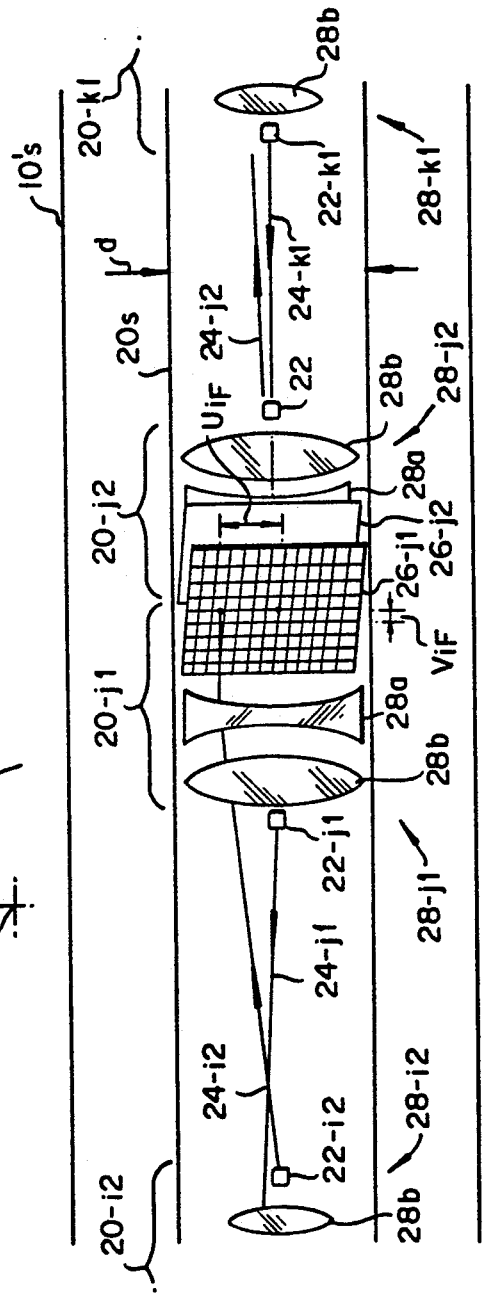
FIG. 2 is a schematic side view of a portion of the array, illustrating several of the parameters of the array.

Referring initially to FIG. 1a, a towed array 10 may be utilized to determine the range and position of a remote source 11, external to the array, and contained in a medium 12, such as a body of water and the like, in which the energy from source 11 propagates, as shown of expanding energy wavefronts 11a–11n. A media-traversing vessel 12a typically is utilized to tow array 10. The array has a first station 10-0, a plurality N of successive intermediate stations and sensors 10-1 through 10-n, and a final array station 10-(n+1) at the far end of the array; additional parallel lines of sensors can also be used, to increase array gain. Ideally, the entire towed array 10 is fully extended along a straight line.

Figure 1B:
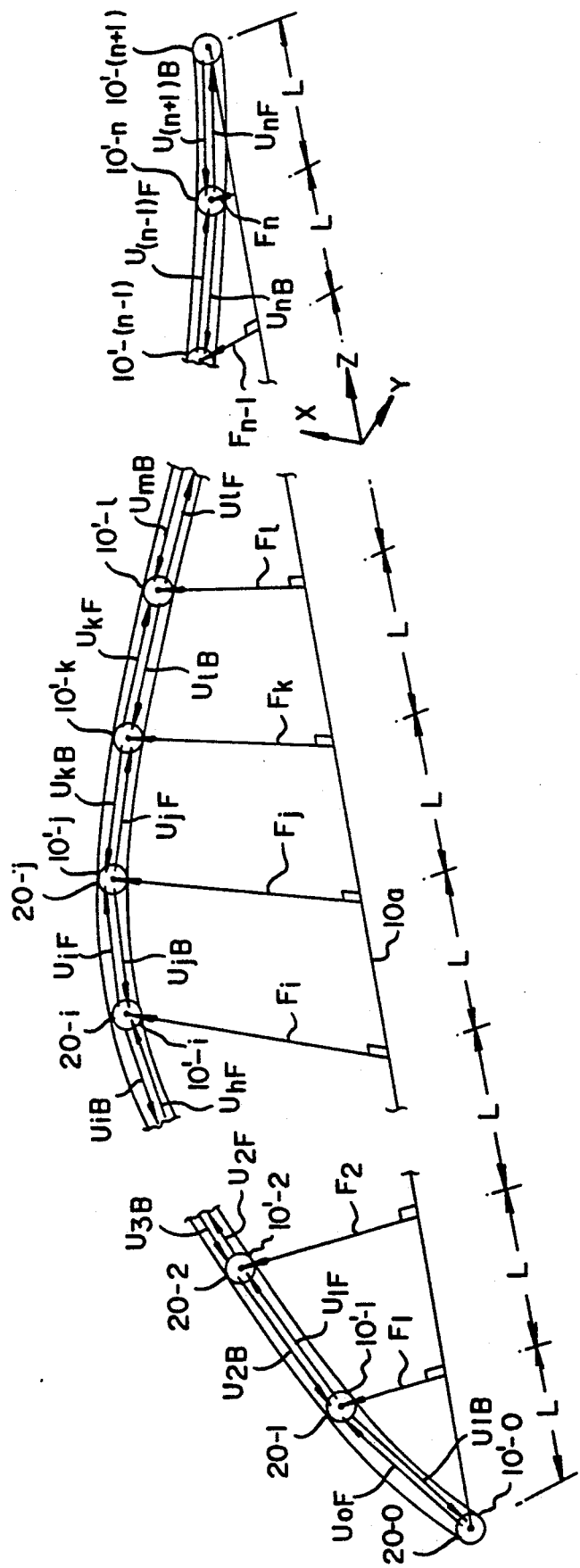
FIG. 1b is a schematic representation of a towed array in a normal, non-ideal configuration.
Figure 1C:
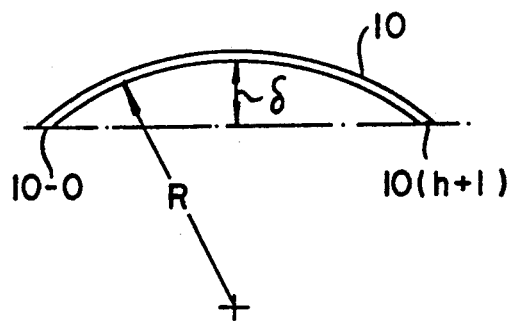
FIG. 1c is a schematic view of the array of FIG. 1b, illustrating the central deviation of a simple bowed set configuration.
Figure 1D:
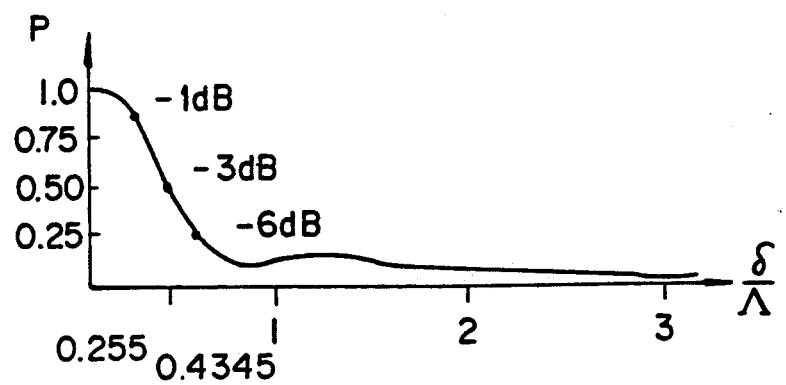
FIG. 1d is a graph illustrating the signal power degradation with respect to deviation per unit wavelength, for the situation shown in FIG. 1c.

Referring now to FIGS. 1b–1d, in actual practice, the towed array 10' can, at any instant, have a shape such that each of the intermediate sensors 10'-1 through 10'-n is displaced by some distance $r_i$, where $1 \leq i \leq n$, from a straight line connecting the end sensors 10'-0 and 10'-(n+1). In the simplest case (FIG. 1c), array 10' has a uniform arc with a metric deviation $\delta$ of its center position from an axis 10a joining the end points 10'-0 and 10'-(n+1); a degradation $\rho$ in the signal power function due to deviation $\delta$ is given by $$\rho = (\Lambda/4\delta)\{C^2(2\sqrt{\delta/\Lambda}) + S^2(2\sqrt{\delta/\Lambda})\} \quad (1)$$

where $\Lambda$ is the acoustic wavelength and C and S are the respective cosine and sine Fresnel integrals. The amount of decrease in the total aperture gain due to uncorrected curvature $\delta$ is shown in FIG. 1d. In addition to this loss in aperture gain, an uncorrected array curvature also results in an increase in beam sidelobes, a wider beam main lobe (leaving a larger bearing uncertainty), as well as bearing bias and oscillation error, loss of range (i.e. localization) capability and the like. For example, in a towed array of 600' length, if the array gain is to be degraded by no more than 1 dB., the deviation $\delta$ must be less than $\lambda/4$. For an acoustic frequency of 10 Hz. the resulting allowance 125' aperture arc deviation $\delta$ requires a minimum radius of curvature R of 360 feet which may be acceptable and achievable in the array towing operation; even with a 100 Hz. acoustic frequency, the resulting allowance 12.5' deviation $\delta$ and minimum R of 3600' may be acceptable, but a required radius of curvature of 36,000' (about 6 miles) and a maximum arc deviation of 1.25' for an acoustic frequency of 1 KHz. is unrealizable in practice. Thus, it is known to those skilled in the art that something must be provided for obtaining positional information in each array transducer 10i with an accuracy which allows the entire system to not only realize the full array gain during straight line towing and towing during turns, but also to properly provide localization at long ranges R, and, as an added benefit, providing left/right ambiguity resolution.

In accordance with the invention, we have found that a sequential set of optical imagers, internally located within the array 10 and each at a location 20-1 through 20-N associated with an associated one of stations 10-1 through 10-N, provide a complete set of displacement second-difference quantities which are equivalent to curvature and which set of difference quantities can be integrated to estimate individual sensor displacement.

Referring now to FIGS. 1b, 2, 3a and 3b, the optical correction system 20 comprises a plurality (n+2) of station modules each separated by a distance L from the nearest neighboring station on each side. All of the stations 20j, where $0 \leq j \leq (n+1)$, can be enclosed within a light-impervious shield 20s, which may be provided along the axis, or otherwise within the outer jacket 10's of the towed array itself. The shield 20s may have a diameter d slightly larger than diameter d' of each typical module 20j. Each end module 20-0 and 20-(n+1), or initial and final module, respectively, has a single optical emitter to serve as an optical source object for imagers 20-1 and 20-N, respectively. All of the plurality N of intermediate optical modules 20-1 through 20-n contain two back-to-back sensors, i.e. the j-th module has 2 sensors 20jF/20jB. Each optical sensor comprises: a means 22 for projecting a beam 24 of light outward from the sensor, along the sensor axis; a photosensitive array 26, which may be a solid state array of photo-sensitive pixels, such as found in a CID (i.e. charge injection device), a CCD (charge coupled device) and the like; and an optical lens means 28, which might be a simple lens or a compound lens comprised of a concave lens 28a nearest to the array of focal length $F_2$ and a convex lens 28b furthest from the array of focal length $F_1$ and so located as to provide additional optical magnification. Advantageously, the magnitude of the focal length $-F_2$ of the concave lens 28a is substantially less than the focal length $F_1$ of the convex lens 28b. Distance D between the two lenses may be made adjustable, as by means of a inter-lens screw mount 28c and the like, to allow the effective focal length $$\frac{F_1 F_2}{(d - F_1 + F_2)}$$

to be adjusted.

If the total length from the convex lens to the retina is constrained, the maximum effective focal length, and hence the maximum magnification is achieved by equalizing the distance between the first lens F1 and the second lens F2 to the distance from the lens F2 to the retinal array. Thus the lens F2 is then situated at the midpoint between lens F1 and the retinal array.

It can be shown under this condition that the effective focal length of the combination, which is proportional to the magnification is given by:

$$F_e = 2D + \frac{D^2}{F_2} \approx \frac{D^2}{F_2}$$

To provide the correct focusing into the retina, the value of the focal length $F_1$ is only slightly larger than D, and is given by:

$$F_1 = D + \frac{1}{\left(\frac{1}{S} + \frac{1}{F_2}\right)}$$

Thus it is shown that the magnification of the imager which can be achieved can be much larger than the value obtainable with a simple lens, which would be 2D. This magnification can be theoretically increased without limit as the chosen value of $F_2$ is made smaller. However, practical considerations place a lower limit on $F_2$, and one would probably not want to select a value less than a few millimeters, for the sake of stability and ease of manufacturing considerations.

Advantageously, light source means 22 is situated adjacent to the center of the front surface of the lens means (that lens surface furthest from the retinal array);

means 22 may be a light-emitting diode (LED), a CW laser diode and the like, and may include a pinhole aperture and the like so as to provide essentially a continuous point source of light.

Each sensor 20i images the light source 22 of its immediate neighbor to obtain information on the deviation of the neighboring module from the linear axis which is the center line of the receiving module. For this purpose, each intermediate module 20-1 through 20-n contains a pair of sensors and, therefore, a set of back-to-back retinal arrays 26, while end modules 20-0 and 20-(n+1) only have a single emitter, and no sensors.

Figure 3A:
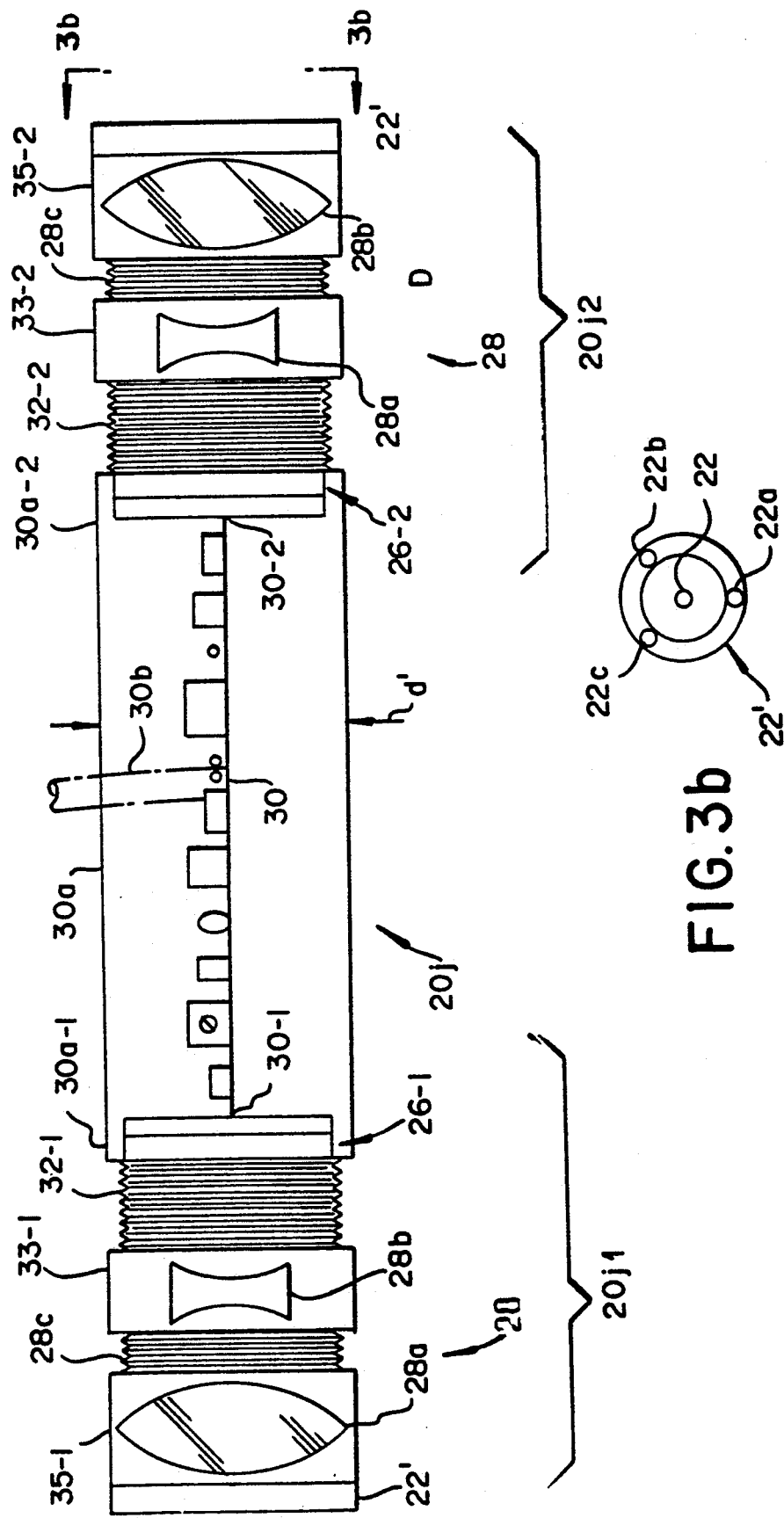
FIG. 3a is a schematic side view of one optical sensor station of the invention.
Figure 3B:
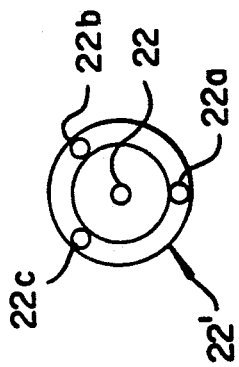
FIG. 3b is an end view of that station, illustrating an array of optical emitters, for determining array twists in addition to array element offset.

As best seen in FIG. 3a, a presently preferred embodiment of optical module 20j contains a common circuit board 30 having affixed to opposite ends 30-1 and 30-2 one of the two retinal arrays 26-1 and 26-2 for the respective first or second submodule of the j-th station. The circuit board 30 can be contained within cylindrical casing 30a, having the retinal arrays 26-1 or 26-2 near opposite ends 30a-1 or 30a-2 thereof. First or second light-excluding screw mounts 32-1 or 32-2 is respectively attached between the casing ends 30a-1 or 30a-2 and casing segments 33-1 or 33-2; the latter typically bear the convex lenses 28b of the first and second sensors, or submodules, 20j1 or 20j2. Mechanisms (not shown) may be provided for changing the distance between the optical center of lens 28b and the associated array 26 surface, so as to adjust the amount of optical magnification. Similarly, means (not shown) operating in conjunction with other casing portions 35 (containing the convex lens 20a) and the concave-lens-mounting casings 33 to adjust the focal length; the screw mounts 28c expands or contracts to provide a light-excluding tube between members 33 and 35. Means 22 can be provided as a single centrally-located source, or may be configured as shown in FIGS. 3a and 3b, where means 22' has not only a central source 22 but also a set of at least three radially-disposed additional source means 22a, 22b and 22c (preferably spaced at about 120° from each other) to enable twist of the array to be determined, as well as flexation.

Each intermediate module images the light sources of both its immediate neighbors; these modules 20-1 through 20-n each have two retinal arrays on the opposite sides of the module and receive an image of the light source from the next-neighboring modules in both directions. The retinal arrays allow the relative coordinates of the neighboring module to be read out of each optical sensor. The two opposite-location coordinate pairs thus obtained are subtracted from one another in a differencing operation which makes the readout substantially immune to any rocking of the receiving module. Measurement error can be made relatively small by utilizing accurate sensor readout: the accuracy can be improved by use of interpolation processes well known to the art to establish much more precise spot locations on each retinal array, with precision less than the dimension of each pixel in the readout array. For example, if the array has a tube diameter d (and therefore a sensor field of view) of about 10 mm., and if each retinal array 26 has about 40 cells on a side (for about total of about 1600 elements) and if an accuracy gain of about five times is achieved by interpolation, the final readout accuracy in terms of lateral position for the next neighboring station light source is $10/(5 \times 40) = 0.05$ mm., or about 1/200 of the field of view.

The resulting data, describing the interpolated position of each beam 24 at an associated submodule 20jF/20jB array, is read out via a data part 30b and is sent via an array cable 12c to data-processing equipment on vessel 12a. The data processing means determines the corrections for each of array sensors 10-1 to 10-n.

SHAPE RECONSTRUCTION

The data from each submodule presents a location measurement corresponding to a light source location with respect to the receiving system axis 10a (FIG. 1b). Each of the readout data thus represents the difference, in both the X and Y directions, between the light source location and the array axis. By subtracting the backward-looking beam vector $U_{jB}$, obtained from each j-th module as an image of the light source at the immediately-previous (j−1)-th module (using data obtained from that j-th module array 26 facing modules 20-(j−1), from the forward-looking beam vector $U_{jF}$ from that same module in the opposite module array obtained from the light source at the next (j+1-st) module, the data processing equipment will generate data which is equivalent to a second-difference of these locations. If a two-dimensional vector $(\bar{r} - \bar{r}_i)$ is used to represent the X-Y location of the i-th sensor at any instant, the backward-looking beam $U_{iB}$ is equal to a first-difference $(\bar{r}_i - \bar{r}_{i-1})$ and the forward-looking beam $U_{iF}$ is equal to another first-difference $-(\bar{r}_i - \bar{r}_{i+1})$. The difference of these first-differences is $(\bar{r}_{i-1} - 2\bar{r}_i + \bar{r}_{i+1})$, which data represents the vector distance from the origin of coordinates in the sensor module to a straight line connecting the origin of the two neighboring modules. A second-difference of this type is obtained for each station and the data is combined to reconstruct the towed array shape. This results in the following equation set, where $\bar{Z}_i$ is the second-difference (curvature) number for the i-th trio of modules:

$$\bar{r}_0 - 2\bar{r}_1 + \bar{r}_2 = \bar{Z}_1$$
$$\bar{r}_1 - 2\bar{r}_2 + \bar{r}_3 = \bar{Z}_2$$
$$\bar{r}_2 - 2\bar{r}_3 + \bar{r}_4 = \bar{Z}_3$$
$$\vdots$$
$$\bar{r}_{n-2} - 2\bar{r}_{n-1} + \bar{r}_n = \bar{Z}_{n-1}$$
$$\bar{r}_{n-1} - 2\bar{r}_n + \bar{r}_{n+1} = \bar{Z}_m$$

so that the sum $S_N$ of the (N−1) equations is $$S_N = \sum_{k=1}^{N-1} (N-k)\bar{Z}_k, \text{ or also} \qquad (A)$$

$$S_{(N+1)} = \sum_{k=1}^{N} (\bar{N}+1-k)\bar{Z}_k \text{ or}$$

$$S_N = \bar{r}_N - \bar{r}_o - N(\bar{r}_1 - \bar{r}_o), \text{ or also}$$

$$S_{(N+1)} = \bar{r}_{(N+1)} - r_o - (N+1)(\bar{r}_1 - \bar{r}_o)$$

This result provides $\bar{r}_n$ with respect to the first reference point $\bar{r}_0$; this difference is referenced to N times the first difference, i.e. $N(\bar{r}_1 - \bar{r}_0)$. If the difference $(\bar{r}_1 - \bar{r}_0)$ between the first two elements is used to calibrate the position of each element in the array, then any error in this first difference is a reference angular error which is propagated throughout the array. Resulting position reference error for each array element is therefore proportional to its distance from the first element. If, as in the previous example, a readout accuracy at each station of 1/20 mm is available and if, in a 60 meter array there are 31 stations with a spacing of L=2 meters, then the value of the reference angular error at the last element would be $(1/20 \text{ mm} \times 30)=1.5$ mm, which is obviously a negligible error, e.g. an error of 0.5% for an acoustic frequency even as high as 5 KHz., with a corresponding wavelength of 300 mm.

Figure 4:
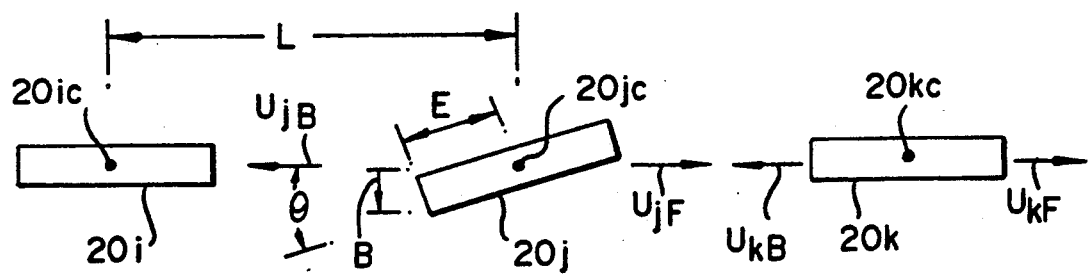
FIG. 4 is a schematic illustration of a portion of a typical calibration system of the present invention.

Referring now to FIG. 4, it will be seen that the foregoing analysis effectively negates the rotational error of an element $20j$, through an angle $\theta$ about its center $20jc$ but does not completely account for any lateral offset error B at the end of each element $20j$, due to the fact that the submodule, "looking" in each direction for each element, has a non-zero submodule length E, so that $\Delta = E/L$ is not zero.

The effect of the lateral movement by distance B can also be removed by using a more complex reconstruction algorithm, which accounts for the biases introduced by these lateral movements at all the sensors. This advanced algorithm will be discussed further in the discussion.

If the biases are thus properly removed, an error analysis can be developed, assuming that each image location measured on the individual retinal arrays is subject to an error which is independent of all other such measurements. Thus the errors in the second difference values are mutually independent. These errors are primarily due to slight geometrical shifts in the focus of sensitivity of the individual pixels in the sensor arrays, and electronic noise in the processing circuits. Each measurement is therefore a combination of location measurements of the two adjoining light sources referenced to the center-line of the imaging system, so that the two values can be combined to construct the desired second-difference. If the expected error in each first-difference (image) measurement is designated as $\sigma_z$, and with the two measurements assumed similar and independent, then the second difference $\bar{Z}i$ will have an expected error which is $\sqrt{2}$ times the expected error associated with each optical location measurement and may therefore be associated either with a limited signal-to-noise ratio in the optical field, or may be simply the assumed limitation of the interpolation process. The expected value of the square of the $S_{N+1}$ second-difference weighted sum is taken and is a summation of N independent terms. Therefore, the expected value of the square of the sum is the sum of the expected values of the squares of the terms taken separately, with the expected values of all cross-products being zero. Hence, $$E\{(S_N)^2\} = \sum_{k=1}^{N} (N-k)^2 \sigma_z^2 = \sum_{k=1}^{N-1} k^2 \sigma_z^2$$

$$= \sigma_z^2 \left\{ \frac{(N-1)^3}{3} + \frac{(N-1)^2}{2} + \frac{(N-1)}{6} \right\}$$

$$= \sigma_z^2 \left\{ \frac{N^3}{3} - \frac{N^2}{2} + \frac{N}{6} \right\} = \sigma_{SM}^2$$

For $N>1$, $\sigma_{SN} \cong (\sigma_z/\sqrt{3}) N^{3/2}$, i.e. the RMS expected error is related to the measurement error at one retina by the 3/2 power of the number N of intermediate modules.

Improved accuracy can be provided by noting that the second difference $S_k$ at the k-th element is (rewriting equation A, supra):

$$S_j = S(\bar{r}_j - \bar{r}_c) - j(\bar{r}_1 - \bar{r}_c) \quad \text{(B)}$$

By forming the deviation $\Delta S_j$ of the j-th element with respect to a new line, now being the line 10a between the two end elements, one can find $$\Delta S_j = S_j - \frac{j}{(N+1)} S_{(n+1)} = (\bar{r}_j - \bar{r}_o) - \frac{j}{N+1} (\bar{r}_{(N+1)} - \bar{r}_o)$$

$$\Delta S_j = \bar{r}_j - \bar{r}_o \frac{(N+1-j)}{(N+1)} - \frac{j}{N+1} \bar{r}_{(N+1)}$$

$$\Delta S_j = \left( \bar{r}_j - \frac{\bar{r}_o + \bar{r}_{(N+1)}}{2} \right) - \frac{j - \frac{N+1}{2}}{N+1} (\bar{r}_{(N+1)} - \bar{r}_o)$$

Note that not only is any reference error leverage reduced, by utilizing a line in three dimensions between the two end elements as the reference, but also that it is still possible to separate the X-plane contributions from the Y-plane contributions. Deviation $\Delta S_j$ can be further evaluated as:

$$\Delta S_j = S_j - \frac{j}{(N+1)} S_{(N+1)}$$

$$\Delta S_j = \sum_{k=1}^{j-1} (j-k) Z_k - \frac{j}{N+1} \sum_{k=1}^{N} (N+1-k) Z_k$$

$$\Delta S_j = -\frac{(N+1-j)}{(N+1)} \sum_{k=1}^{j-1} k Z_k - \frac{j}{N+1} \sum_{k=j}^{N} (N+1-k) Z_k$$

The expectation of the square of $S_{NK}$ can then be shown to be:

$$\sigma_j^2 = E\{\Delta S_j^2\} = \sigma_z^2 \frac{j(N+1-j)}{6(N+1)} \{2j(N+1-j)+1\} \quad \text{(C)}$$

AND FOR $N$ AND $j >> 1$ $$\sigma_j^2 \cong \sigma_z^2 \frac{j^2(N-j)^2}{3N}$$

The maximum error $(\sigma_{SNK})^2_{max}$ is approximately $\sigma_z^2 N^3/48$, at $K=N/2$, or $$(\sigma_{SNK})_{max} \cong \sigma_z N^{3/2}/(4\sqrt{3})$$

which is a factor of 4 better than the RMS errors found when using a baseline only between the head-end (zero-th) sensor and first intermediate sensor. Thus, improved accuracy is possible by use of a baseline 10a between head-end (zero-th) and tail-end (n+1-st) elements of the array.

Utilizing the same example, with a retinal array of 40 elements width and an interpolation improvement factor of 5, we see that $\sigma_z = d/200$. If the same 60 meter array with 31 stations is used, we have $(\sigma_{SNK})_{max} = (d/(200.4\sqrt{3})) \cdot 30^{3/2} = 0.12$ d. Similarly, it can be calculated that the total number of stations N could be raised to a maximum of 124, for which the expected maximum deviation error would be no larger than the optical shroud diameter d.

The foregoing error analysis assumes that any significant twist of the array is removed. Twist may be negligible due to the stiffness of the jacket; if not, the is removed. Twist may be negligible due to the stiffness of the jacket; if not, the 4-emitter array of FIG. 3b can be utilized: the center point is again the target and the three equally-spaced outer emitters are utilized to determine twist. Any twist angle is mathematically removed in the calculation of the second difference. With the four-emitter pattern shown, and if the field of view encompasses the entire pattern with the center spot at the origin, then even with offsets, at least two beam spots will always be visible on the retinal array. If the twist between stations is less than 60°, the target and twist reference spots can each be identified unambiguously. Both the target and reference spots would be found and a 3×3 cluster readout would be executed for each. The resulting amplitudes would be transmitted back to the vessel for processing, or, alternatively, a separate ASIC/processor could be provided within each module 20 for processing twist and/or offset. In the latter event, only the twist and/or offset resultant data would be transmitted back to the main beam-forming processing equipment aboard the vessel.

We presently believe that the proper and best method for calculating the offset distances of the N intermediate elements from the line between the initial (j=0) and final (j=N+1) element, which properly removes the bias errors caused by the lateral movements of the light sources, previously referred to as a value of B, is accomplished by performing a general high-grain towed-array algorithm matrix of the form:

$$k = 1, 2, \ldots, N \quad 1, 2, \ldots, N$$

$$j = \begin{bmatrix} 1 \\ 2 \\ \vdots \\ N \end{bmatrix} \begin{bmatrix} X_j \end{bmatrix} = \begin{bmatrix} X_B & | & X_F \end{bmatrix} \begin{bmatrix} u_{kB} \\ \vdots \\ u_{kF} \end{bmatrix}$$

where the $X_B$ and $X_F$ terms are given by the definitional equations:

$$X_B \begin{cases} k = 1 & X_{Bj1} = -\left(1 - \frac{j}{(N+1)}\right) \\ j < k & X_{Bjk} = \frac{-j[(N+1-k)+\Delta]}{(N+1)(1-2\Delta)} \\ j \geq k & X_{Bjk} = \frac{-[(N+1-j)(k-\Delta)]}{(N+1)(1-2\Delta)} \end{cases}$$

and $$X_F \begin{cases} k = N & X_{FjN} = -\frac{j}{(N+1)} \\ j \leq k & X_{Fjk} = \frac{-j[(N+1-k)-\Delta]}{(N+1)(1-2\Delta)} \\ j > k & X_{Fjk} = \frac{-[(N+1-j)(k+\Delta)]}{(N+1)(1-2\Delta)} \end{cases}$$

with $\Delta = E/L$ being a known constant and the right hand matrix containing the backward offset data $U_{kB}$ and forward offset $U_{kF}$ readout of the arrays 26 of the sequential modules. Thus, with an array of four stations with 2 end stations having single emitters 22 and N=2 intermediate stations 20, each with a back-to-back pair of arrays 26 and a spaced-apart pair of emitters 22 providing beams 24 in opposite directions, the X dimension offsets $X_1$ and $X_2$ respectively of the N=1 and N=2 stations is found by performing:

$$\begin{bmatrix} x_1 \\ x_2 \end{bmatrix} = \frac{-1}{3(1-2\Delta)} \left[ \begin{bmatrix} 2 & 1 & | & 2 & 1 \\ 1 & 2 & | & 1 & 2 \end{bmatrix} + \Delta \begin{bmatrix} -4 & +1 & | & -1 & -2 \\ -2 & -1 & | & +1 & -4 \end{bmatrix} \right] \begin{bmatrix} u_{1B} \\ u_{2B} \\ u_{1F} \\ u_{2F} \end{bmatrix}$$

one the retinal array distances are found. The first-intermediate (N=1) sensor backlooking distance $U_{1B}$ is data output from the retina 26 of the first sensor 20-1, responsive to the beam 24-02 from the emitter 22 of the nearest (left-most) emitter 20-0; the companion forward-looking distance $U_{1F}$ is data output from the retina 26 of the forward-looking sensor 20-1 submodule 20-12, responsive to the nearest (right-most) emitter 22-21 (see FIG. 2 for the general case). Similarly, $U_{2F}$ is data output from the array 26-22 of the N-2 sensor 20-2, responsive to the leftward beam 24-31 from the righthand emitter 22-31 of the rightmost (N=3) element, and $U_{2B}$ is data output from the array 26-21 in the lefthand submodule of the second (N=2) sensor 20-21 responsive to the rightward beam 24-12 emitted by the righthand emitter 22-12 of the first (N=1) sensor 20-12.

For a 5 element (N=3 intermediate sensors) array, the matrices are:

$$\begin{bmatrix} x_1 \\ x_2 \\ x_3 \end{bmatrix} = \frac{-1}{4(1-2\Delta)} \left[ \begin{bmatrix} 3 & 2 & 1 & | & 3 & 2 & 1 \\ 2 & 4 & 2 & | & 2 & 4 & 2 \\ 1 & 2 & 3 & | & 1 & 2 & 3 \end{bmatrix} + \Delta \begin{bmatrix} -6 & +1 & +1 & | & -1 & -1 & -2 \\ -4 & -2 & +2 & | & +2 & -2 & -4 \\ -2 & -1 & -1 & | & +1 & +1 & -6 \end{bmatrix} \right] \begin{bmatrix} u_{1B} \\ u_{2B} \\ u_{3B} \\ u_{1F} \\ u_{2F} \\ u_{3F} \end{bmatrix}$$

while for a sensor element (N=5) array, they are:

$$\begin{bmatrix} X_1 \\ X_2 \\ X_3 \\ X_4 \\ X_5 \end{bmatrix} = \frac{-1}{6(1-2\Delta)} \left[ \begin{bmatrix} 5 & 4 & 3 & 2 & 1 & | & 5 & 4 & 3 & 2 & 1 \\ 4 & 8 & 6 & 4 & 2 & | & 4 & 8 & 6 & 4 & 2 \\ 3 & 6 & 9 & 6 & 3 & | & 3 & 6 & 9 & 6 & 3 \\ 2 & 4 & 6 & 8 & 4 & | & 2 & 4 & 6 & 8 & 4 \\ 1 & 2 & 3 & 4 & 5 & | & 1 & 2 & 3 & 4 & 5 \end{bmatrix} + \Delta \begin{bmatrix} -10 & +1 & +1 & +1 & +1 & | & -1 & -1 & -1 & -1 & -2 \\ -8 & -4 & +2 & +2 & +2 & | & +4 & -2 & -2 & -2 & -4 \\ -6 & -3 & -3 & +3 & +3 & | & +3 & +3 & -3 & -3 & -6 \\ -4 & -2 & -2 & -2 & +4 & | & +2 & +2 & +2 & -4 & -8 \\ -2 & -1 & -1 & -1 & -1 & | & +1 & +1 & +1 & +1 & -10 \end{bmatrix} \right] \begin{bmatrix} u_{1B} \\ u_{2B} \\ u_{3B} \\ u_{4B} \\ u_{5B} \\ u_{1F} \\ u_{2F} \\ u_{3F} \\ u_{4F} \\ u_{5F} \end{bmatrix}$$

and, in general, for an (N+2) array, with N intermediate sensors, we must perform the matrix equation $$\begin{bmatrix} x_1 \\ x_2 \\ x_3 \\ \vdots \\ x_N \end{bmatrix} = \frac{-1}{(N+1)(1-2\Delta)} \left\{ \begin{bmatrix} N & (N-1) & (N-2) & \cdots & 3 & 2 & 1 \\ (N-1) & 2(N-1) & 2(N-2) & \cdots & 6 & 4 & 2 \\ (N-2) & 2(N-2) & 3(N-2) & \cdots & 9 & 6 & 3 \\ \vdots & \vdots & \vdots & \ddots & \vdots & \vdots & \vdots \\ 3 & 6 & 9 & \cdots & 3(N-2) & 2(N-2) & (N-2) \\ 2 & 4 & 6 & \cdots & 2(N-2) & 2(N-1) & (N-1) \\ 1 & 2 & 3 & \cdots & (N-2) & (N-1) & N \end{bmatrix} + \Delta \begin{bmatrix} -2N & +1 & +1 & \cdots & +1 & +1 & +1 \\ -2(N-1) & -(N-1) & +2 & \cdots & +2 & +2 & +2 \\ -2(N-2) & -(N-2) & -(N-2) & \cdots & +3 & +3 & +3 \\ \vdots & \vdots & \vdots & \ddots & \vdots & \vdots & \vdots \\ -6 & -3 & -3 & \cdots & -3 & -2 & -1 \\ -4 & -2 & -2 & \cdots & -2 & (N-1) & -(N-1) \\ -2 & -1 & -1 & \cdots & -1 & -(N-2) & -2N \end{bmatrix} \right\} \begin{bmatrix} u_{1B} \\ u_{2B} \\ u_{3B} \\ \vdots \\ u_{(N-2)B} \\ u_{(N-1)B} \\ u_{NB} \end{bmatrix} + \left\{ \begin{bmatrix} N & (N-1) & (N-2) & \cdots & 3 & 2 & 1 \\ (N-1) & 2(N-1) & 2(N-2) & \cdots & 6 & 4 & 2 \\ (N-2) & 2(N-2) & 3(N-2) & \cdots & 9 & 6 & 3 \\ \vdots & \vdots & \vdots & \ddots & \vdots & \vdots & \vdots \\ 3 & 6 & 9 & \cdots & 3(N-2) & 2(N-2) & (N-2) \\ 2 & 4 & 6 & \cdots & 2(N-2) & 2(N-1) & (N-1) \\ 1 & 2 & 3 & \cdots & (N-2) & (N-1) & N \end{bmatrix} + \Delta \begin{bmatrix} -2N & -2(N-1) & -2(N-2) & \cdots & -2 & -4 & -6 \\ -2(N-1) & -(N-1) & -2 & \cdots & -2 & -4 & -6 \\ -2(N-2) & -2 & -(N-2) & \cdots & -3 & -2 & -6 \\ \vdots & \vdots & \vdots & \ddots & \vdots & \vdots & \vdots \\ -6 & -3 & -1 & \cdots & -1 & -1 & -2 \\ -4 & -2 & -2 & \cdots & -2 & -2 & -4 \\ -2 & -1 & -3 & \cdots & -3 & -3 & -2N \end{bmatrix} \right\} \begin{bmatrix} u_{1F} \\ u_{2F} \\ u_{3F} \\ \vdots \\ u_{(N-2)F} \\ u_{(N-1)F} \\ u_{NF} \end{bmatrix}$$

It will be seen that the same algorithms can be used to find the Y dimension offsets $Y_1, \ldots, Y_N$, if necessary, by use of Y offsets $V_{iF}$ and $V_{iB}$ readout from the set of array means 26.

OPTICAL DESIGN

It is important that the length 2E of each module be kept reasonably short, so that the distance between opposite light sources on each module is only a small fraction of the module spacing L, to increase accuracy of the shape reconstruction. The total number of stations is calculated by realizing that, as a minimum, a clear line-of-sight from the center light source of one module to the center of the facing retinal array of the next module is required. This requires a spacing L of not more than $2\sqrt{dR}$, where R is the radius of curvature of towed array 10. For example, if the tube diameter d is one cm., and the radius of curvature R is 100 meters, a maximum spacing L of two meters must be provided. This implies a minimum of 31 stations (i.e. N=29) in a 60 meter array. If the towed array utilizes couplers for quick connect/disconnect of array segments, each coupler must include an optical module with a retinal array looking out from each coupler end.

While a presently preferred embodiment of our novel apparatus, for detecting deviations from a straight line along the length of a towed energy-beam-forming array, and the companion method of use have been described in detail herein above, many modifications and variations will now become apparent to those skilled in the art. It is our intent, therefore, to be limited only by the scope of the appending claims and not by the specific details and instrumentalities presented by way of explanation herein.

What is claimed is:

1. Apparatus for detecting deviation from a straight line of each of a plurality (N+2) of stations of an energy-beam-forming sensor array, comprising:
   a plurality (N) of optical sensing module means, each having a known relationship to an associated one of the array sensors, for mutually imaging each other to provide first-difference data responsive to a displacement of the sensing module means from said straight line;
   means receiving the first-difference data for generating second-difference data from each optical sensing module means; and
   means for processing the second-difference data from all optical sensing module means to provide a present deviation of each sensing module means from said straight line.

2. The apparatus of claim 1, wherein each i-th optical sensing module means, where $1 \leq i \leq (N)$, comprises: source means for directing an outgoing beam of light toward an adjacent sensing module means; and means for focusing an incoming light beam upon a location in a plane offset from a central location, at which the incoming beam would be focused if no deviation was present, by a distance responsive to an amount of deviation therebetween.

3. The apparatus of claim 2, wherein an initial (i=0) optical station means and a final (i=N+1) optical station means each have only one optical emitter means, each directed toward a neighboring sensing module means.

4. The apparatus of claim 3, wherein each of N intermediate optical sensing means (i=1 to i=N) have a pair of submodules, each submodule having focusing means receiving an incoming beam from a direction generally opposite to a direction from which the focusing means of the other submodule is receiving an incoming beam; and each submodule having a source means emitting an outgoing beam from a direction generally opposite to a direction in which the source means of the other submodule is emitting an outgoing beam.

5. The apparatus of claim 4, wherein each focusing means comprises a retinal array of photoreceptive cells.

6. The apparatus of claim 5, wherein each array is selected from the group of CID and CCD arrays.

7. The apparatus of claim 5, wherein each focusing means further comprises lens means, aligned along a line on which the incoming beam would be focused of no deviation was present, for directing the incoming light beam to the retinal array.

8. The apparatus of claim 2, wherein the plurality of sensing module means are arranged with an initial and final module means respectively forming the opposite ends of said straight line.

9. The apparatus of claim 2, wherein the second-difference generating means includes a local processor means, provided as part of each i-th module, for generating a first quantity $U_{iB}$ between that i-th module means and an immediately-previous (i−1)-st module means, and a second quantity $U_{iF}$ between that i-th module means and an immediately-following (i+1)-st module means.

10. The apparatus of claim 9, wherein the second-difference data processing means provides the deviations $X_i$ between a phase center of the i-th module means and said straight line by performing a matrix equation.

11. A method for detecting a deviation distance from a straight line of each of a plurality (N+2) of stations of an energy-beam-forming sensor array, comprising:
   (a) providing a plurality (N) of optical sensing modules;
   (b) positioning each module both with a known relationship to an associated one of the array sensors and for mutually imagining of adjacent modules;
   (c) obtaining first-difference data responsive to a displacement of each sensing module from the straight line;
   (d) using the first-difference data for generating second-difference data from each optical sensing module; and
   (e) processing the second-difference data from all optical sensing modules to provide a present deviation of each sensing module from the straight line.

12. The method of claim 11, wherein step (a) includes the steps of: directing an outgoing beam of light from each i-th optical sensing module, where $1 \leq i \leq (N)$, toward an adjacent sensing module; and focusing an incoming light beam, from an adjacent module, upon a location in a plane offset from a central location, at which the incoming beam would be focused if no deviation was present, by a distance responsive to an amount of deviation therebetween.

13. The method of claim 12 wherein step (b) includes the step of providing each of an initial (i=0) optical station and a final (i=N+1) optical station with only one optical emitter directed toward a neighboring sensing module.

14. The method of claim 13, wherein step (a) further includes the step of providing each of N intermediate optical sensing modules (i=1 to i=N) as a pair of submodules; and step (c) includes the step of causing each submodule to receive an incoming beam from a direction generally opposite to a direction from which the other submodule is receiving an incoming beam; and having each submodule emit an outgoing beam in a direction generally opposite to a direction in which the other submodule is emitting an outgoing beam.

15. The method of claim 14, wherein step (c) includes the step of providing each submodule with a retinal array of photoreceptive cells.

16. The method of claim 15, wherein step (c) includes the step of selecting each retinal array from the group of CID and CCD arrays.

17. The method of claim 15, wherein step (c) includes the further step of providing each submodule with a lens, aligned along a line on which the incoming beam would be focused if no deviation was present, for directing the incoming light beam to the retinal array.

18. The method of claim 12, wherein the plurality of sensing modules are arranged with an initial and final module respectively forming the opposite ends of the straight line.

19. The method of claim 12, wherein step (d) includes the step of local generating, at each i-th module, a first quantity $U_{iB}$ between that i-th module and an immediately-previous (i−1)-st module, and a second quantity $U_{iF}$ between that i-th module and an immediately-following (i+1)-st module.

20. The method of claim 19, wherein step (e) includes the step of obtaining a deviation $X_i$ between a phase-center of the i-th module means and the straight line by performing a matrix equation $$k = 1, 2, \ldots, N \quad 1, 2, \ldots, N$$

$$j = \begin{matrix} 1 \\ 2 \\ \vdots \\ N \end{matrix} [X_j] = \begin{bmatrix} X_B & | & X_F \end{bmatrix} \begin{bmatrix} u_{kB} \\ \ldots \\ u_{kF} \end{bmatrix}$$

where the $X_B$ and $X_F$ terms are given by the definitional equations:

$$X_B \begin{cases} k = 1 & X_{Bj1} = -\left(1 - \frac{j}{(N+1)}\right) \\ j < k & X_{Bjk} = \frac{-j[(N+1-k)+\Delta]}{(N+1)(1-2\Delta)} \\ j \geq k & X_{Bjk} = \frac{-[(N+j)(k-\Delta)]}{(N+1)(1-2\Delta)} \end{cases}$$

and $$X_F \begin{cases} k = N & X_{FjN} = -\frac{j}{(N+1)} \\ j \leq k & X_{Fjk} = \frac{-j[(N+1-k)-\Delta]}{(N+1)(1-2\Delta)} \\ j > k & X_{Fjk} = \frac{-[(N+1-j)(k+\Delta)]}{(N+1)(1-2\Delta)} \end{cases}$$

where $\Delta = E/L$, with E being the length of each module from its center to an end thereof and L is a substantially-constant distance between the phase-centers of adjacent modules to provide a present deviation of each sensing module means from said straight line.

* * * * *